United States Patent
Dämon et al.

(10) Patent No.: US 9,356,329 B2
(45) Date of Patent: May 31, 2016

(54) BATTERY SYSTEM WITH ABSORPTION DEVICE

(71) Applicant: SAMSUNG SDI CO., LTD., Yongin-si, Gyeonggi-do (KR)

(72) Inventors: Peter Dämon, Laßnitzhöhe (AT); Georg Eichberger, Graz (AT); Ralph Wünsche, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 172 days.

(21) Appl. No.: 14/174,556

(22) Filed: Feb. 6, 2014

(65) Prior Publication Data

US 2014/0220405 A1    Aug. 7, 2014

(30) Foreign Application Priority Data

Feb. 6, 2013 (EP) .................................... 13154164

(51) Int. Cl.

| | | |
|---|---|---|
| *H01M 6/42* | (2006.01) | |
| *H01M 10/52* | (2006.01) | |
| *H01M 2/10* | (2006.01) | |
| *H01M 10/625* | (2014.01) | |
| *H01M 10/6567* | (2014.01) | |

(52) U.S. Cl.
CPC ............ *H01M 10/52* (2013.01); *H01M 2/1077* (2013.01); *H01M 2/1094* (2013.01); *H01M 10/5016* (2013.01); *H01M 10/625* (2015.04); *H01M 10/6567* (2015.04); *H01M 2220/20* (2013.01)

(58) Field of Classification Search
CPC ............ H01M 10/5016; H01M 10/52; H01M 10/625; H01M 10/6567; H01M 2220/20; H01M 2/1077; H01M 2/1094
See application file for complete search history.

(56) References Cited

U.S. PATENT DOCUMENTS

| 6,308,728 B1* | 10/2001 | Frazier .................... G01M 3/04 |
| | | 137/15.11 |
| 2002/0061436 A1* | 5/2002 | Inagaki ............... H01M 2/0212 |
| | | 429/120 |
| 2012/0263988 A1* | 10/2012 | Obasih ............. H01M 10/5004 |
| | | 429/98 |

FOREIGN PATENT DOCUMENTS

| CN | 1767259 A | 5/2006 |
| DE | 10 2010 012 927 A1 | 9/2011 |
| EP | 2 533 346 A1 | 12/2012 |

OTHER PUBLICATIONS

SIPO Office action dated Oct. 10, 2015, for corresponding Chinese Patent application 201310537632.7, (14 pages).

* cited by examiner

*Primary Examiner* — Patrick Ryan
*Assistant Examiner* — Ben Lewis
(74) *Attorney, Agent, or Firm* — Lewis Roca Rothgerber Christie LLP

(57) ABSTRACT

A battery system having a plurality of cells in a battery housing, and an absorption device arranged in the battery housing to absorbs fluid that has escaped in the battery housing.

19 Claims, 6 Drawing Sheets

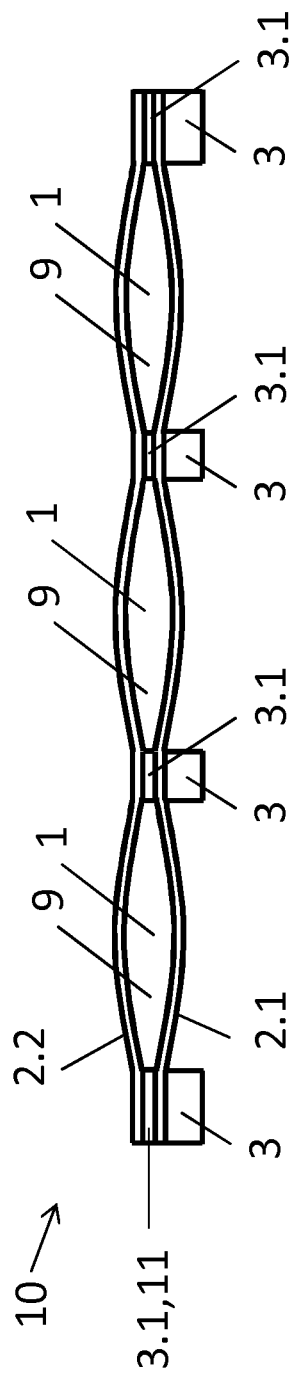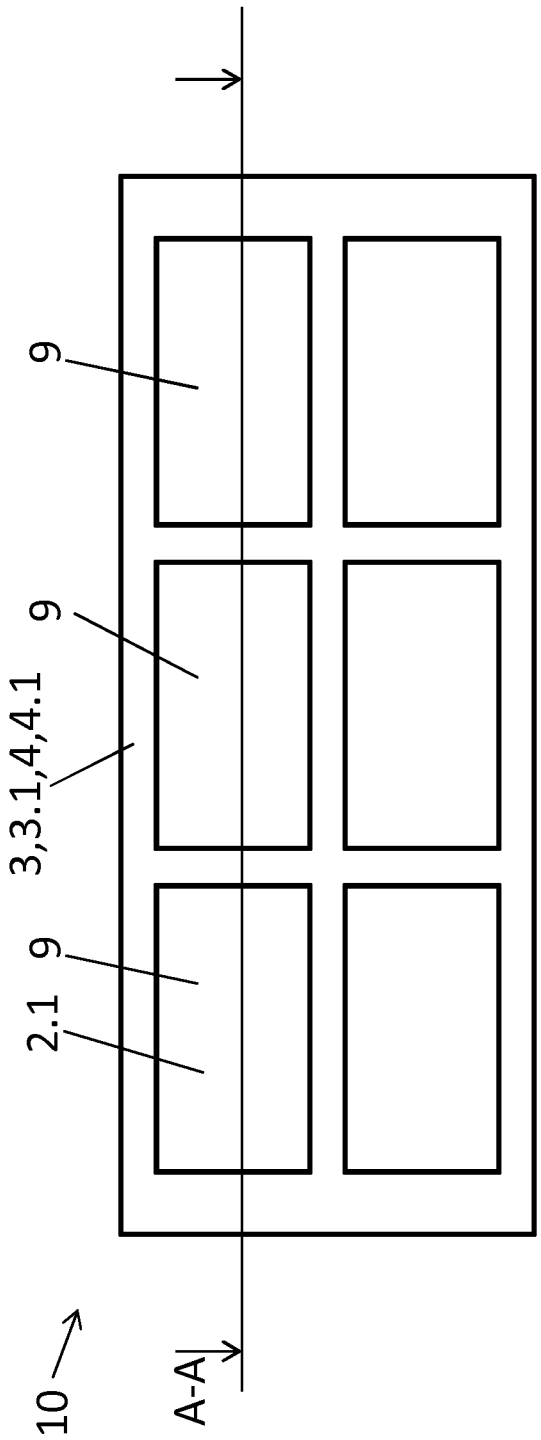

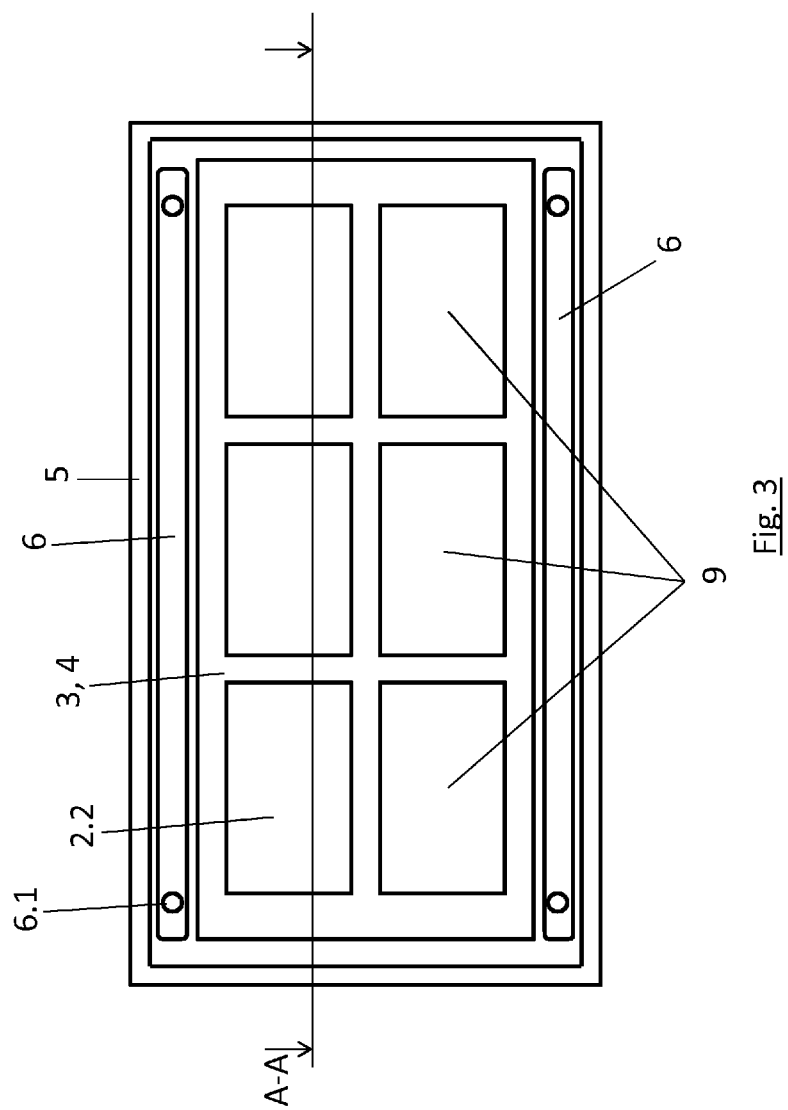

BATTERY SYSTEM WITH ABSORPTION DEVICE

CROSS-REFERENCE TO RELATED APPLICATIONS

The present application claims priority 35 U.S.C. §119 to European Patent Publication No. EP 13154164.1, (filed on Feb. 6, 2013), which is hereby incorporated by reference in its entirety.

TECHNICAL FIELD

Embodiments relate to a battery system having a plurality of cells in a battery housing, and an absorption device arranged in the battery housing to absorbs fluid that has escaped in the battery housing.

BACKGROUND

Battery systems having a plurality of cells are used in particular as energy storage devices for the drive of electric and hybrid vehicles. In order to ensure an optimal function of the battery system, it is expedient to keep the temperature of the cells in a desired operating range. In order to prevent the operating temperature from exceeding and/or falling below this range, active or passive temperature-control systems are used. The use of a liquid temperature-control system that is guided along the battery cells with effective thermal conduction, generally in a heat sink, has proven to be particularly successful.

It is problematic, however that, for example, in the event of a collision involving a vehicle equipped in such a manner, leaks may occur and the temperature-control system may thus escape from the heat sink. The temperature-control system may then come into direct contact with the battery cells and its conductivity may trigger a short circuit.

To increase the operational reliability of battery systems, it is known to provide absorption devices, by way of which the fluid that has escaped in the battery housing may be bound.

A storage module having a number of storage cells is known from German Patent Publication No. DE 10 2010 010 844 A1, in which an absorbent layer is arranged in order to absorb and bind leaking electrolyte in the region of a valve via which an internal pressure present in a storage cell may be relieved and electrolyte may escape. The absorbent layer may include a two-ply structural film and may have a plurality of pockets or cushions delimited by one another.

SUMMARY

In accordance with embodiments, battery systems are provided having a reliable absorption device, and which may be produced easily and cost effectively.

In accordance with embodiments, battery system are provided, each including a plurality of cells in a battery housing, and an absorption device arranged in the battery housing.

In accordance with embodiments, battery system are provided, each including a plurality of cells in a battery housing, and an absorption device arranged in the battery housing to absorb fluid that has escaped into the housing.

In accordance with embodiments, the absorption device may include a plurality of absorbing elements arranged between inner faces of a first and a second material ply, the first and second material plies forming pockets configured to receive the absorbing elements. The battery system may include at least one support element configured to have a dual function of forming the pockets and fastening the absorption device to the battery housing.

In accordance with embodiments, a battery system includes a system that simultaneously serves to form pockets in the material plies, such that absorbing elements may be positioned in a targeted manner in the absorption device and also to fasten the entire absorption device to the battery housing. The support element both fastens the absorption device to the housing and connects the first material ply to the second material ply over portions, such that pockets for receiving absorbing elements are formed between these connections provided over portions.

In accordance with embodiments, the absorption device may be fastened to the battery housing directly via the support element or also indirectly via additional fastening device.

The support element may have a rectangular cross-section or a grid-type cross-section. The support element may thus produce rectangular-shaped or grid-shaped connections between the first and second material plies, such that pockets for receiving the absorbing elements are formed between the frame-shaped or grid-shaped connection points between the material plies.

The first and/or the second material ply may be fluid-permeable. Both material plies may be fluid-permeable such that a fluid may reach the absorbing elements on all sides in an unhindered manner. Only one of the material plies, for example, the material ply facing the cells, may also be fluid-permeable such that an inflow of a fluid is enabled, however an outflow is prevented. The material plies may also be fluid-permeable only over selective portions. The first and/or second material ply may be formed of a resilient material, such as, for example, nylon fabric.

The first material ply preferably has a thickness less than 0.5 mm, in particular less than 0.3 mm or less than 0.1 mm. The connection over portions between the material plies may thus be simplified, for example by an easier penetration of the material plies by adhesive.

In accordance with embodiments, the first material layer has a plurality of apertures over certain portions thereof. Such apertures may also facilitate the connection over portions between the material plies, since, for example, an adhesive or other devices for connecting the two material plies may act unhindered through the apertures. Depending on the support element used, it may also be advantageous if the second material ply also has apertures over certain portions thereof.

The support element may be fastened to the base of the battery housing in an installation position, for example, in a vehicle. The support element may be fastened to the battery housing in particular by adhesive bonding or welding, or also by riveting or screwing. The support element may be designed as a separate component, but may also be formed in a single piece with the battery housing.

In accordance with embodiments, the support element is a two-sided adhesive element, in particular two-sided adhesive film, attached between the outer face of the first material ply and the battery housing, the first material ply and the adhesive of the adhesive element being formed such that the adhesive of the adhesive element is effective, at least over portions, through the first material ply. Due to the action of the adhesive on the inner face of the first material ply, the necessary connection over portions between the first and second material ply is produced, such that the formation of pockets is enabled. The action of the adhesive through the first material ply may be enabled for example by a porous nature of the first material ply or by apertures or openings, over portions, in the first material ply and also by a sufficient thickness of the adhesive layer.

In accordance with embodiments, a second two-sided adhesive element, in particular a second two-sided adhesive film, may also be attached between the first material ply and the second material ply over portions, such that, in regions, for example, at connection lines that form a grid within a predefined frame, a further, second adhesive element is effective in addition to the externally acting adhesive of the adhesive element serving as a support element.

In accordance with embodiments, the support element has a frame attached between the outer face of the first material ply and the battery housing, a counter frame being attached to the outer face of the second material ply for the formation of pockets, the frame and the counter frame being interconnectable. Due to the connection of the frame to the counter frame, the first material ply is also connected to the second material ply in the relevant portions, thus enabling the formation of pockets. The frame and counter frame may be formed as a grid and counter grid, such that a plurality of pockets may be formed with just one element and counter element. The frame or the grid and the counter elements thereof may be formed rigidly in particular.

The frame may include first extensions and the counter frame may have second extensions, the first and second extensions being plugged into one another. In this case, the pockets are formed by simply plugging a counter frame or counter grid into a frame or grid that for example is already mounted on the battery housing. The frame and the counter frame or grid and counter grid may alternatively or additionally be welded, adhesively bonded, screwed, riveted or sewn to one another. The frame may also be formed by the battery housing. The counter frame may be formed by a heat sink. The frame and/or the counter frame is/are composed of a polymer or a metal, for example, as a pressed screen. Production may also occur by way injection moulding.

The cells may be fastened to the base of the battery housing by way fastening portions, for example, fastening strips, in the installation position. In particular, the lower edges of the cells are advantageously arranged higher than the absorbing elements. Fluid escaping from the cells may thus reach the absorption device as a result of gravity.

A heat sink may be arranged in the battery housing and in particular may be adapted to cool the cells by way a coolant. The heat sink, in particular coolant ducts through which coolant flows, is then arranged spatially higher in the installation position than the absorbing elements, such that escaping coolant may easily reach the absorption device. For the arrangement of the absorbing elements relative to the coolant ducts, it may also be taken into consideration however that, with regard to the battery system, for example when installed in a vehicle that may come to lie on its roof in the event of a collision, the force of gravity may act in directions other than intended.

In accordance with embodiments, a battery system may include at least one of: a housing; a plurality of cells in the housing; a support element; and an absorption device connected to the battery housing by the at least one support and which is configured to absorb fluid that has escaped in the housing, the absorption device having a first material ply, a second material ply connected over certain regions thereof to the first material ply in such a manner which forms a plurality of pockets, and an absorbing element received in a corresponding pocket.

In accordance with embodiments, a battery system may include at least one of: a housing having a first support frame section having first support frame extensions forming male connectors and a second support frame section having second support frame extensions forming female connectors which respectively receive a corresponding male connector to removeably connect the first support frame section to the second support frame section; a plurality of cells in the housing; and an absorption device in the battery housing to absorb fluid that has escaped in the housing, the absorption device having a first material ply, a second material ply connected to the first material ply in such a manner which forms a plurality of pockets, and an absorbing element received in a corresponding pocket.

DRAWINGS

Embodiments will be illustrated by way of example in the drawings and explained in the description below:

FIG. 1 illustrates a side view of an absorption device of a battery system corresponding to the line of section A-A in FIG. 2, in accordance with embodiments.

FIG. 2 illustrates a bottom view of the absorption device of FIG. 1.

FIG. 3 illustrates a top view of the absorption device in a battery housing.

Figure 4:
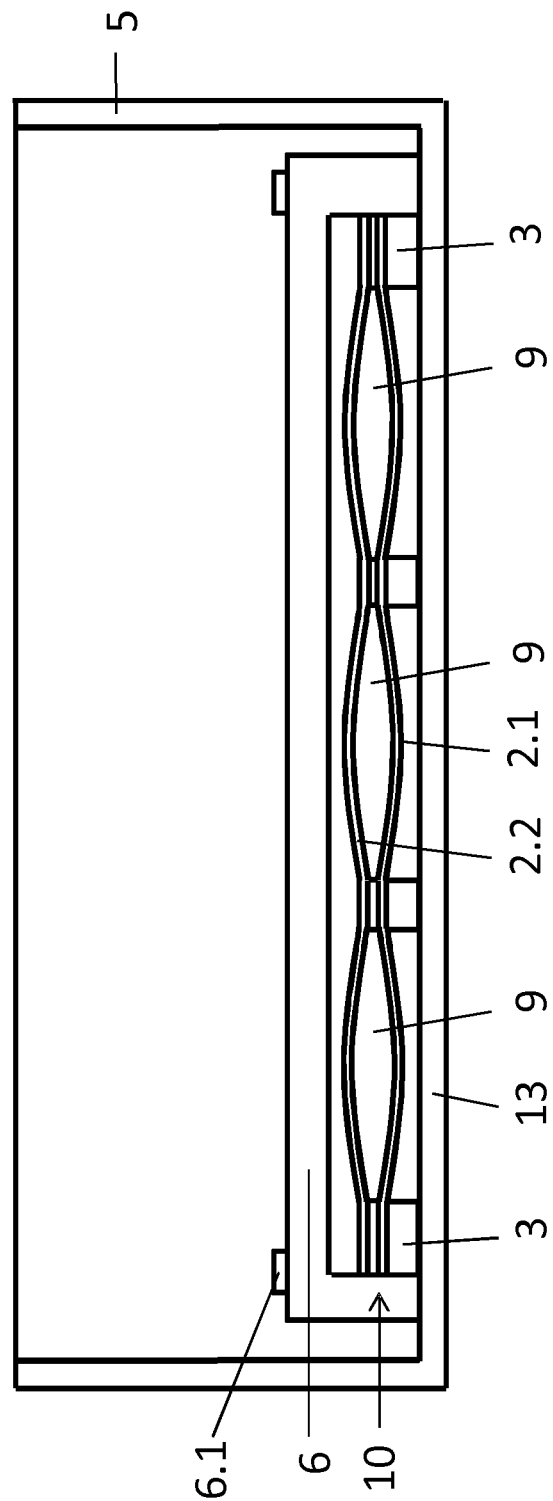
FIG. 4 illustrates a side view of along the line of section A-A of FIG. 3.
Figure 5:
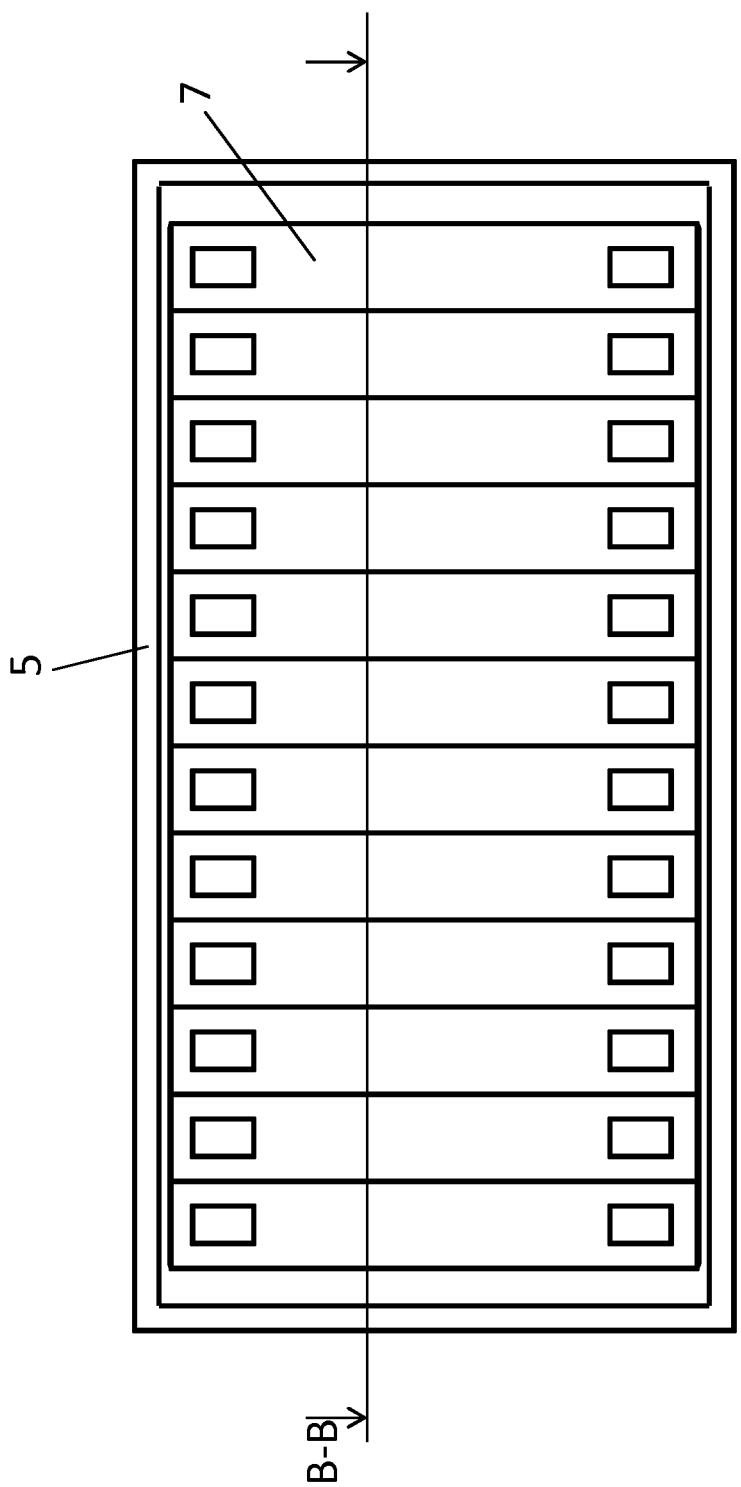
FIG. 5 illustrates a top view of a battery system with cells, in accordance with embodiments.

FIGS. 7(a) and 7(b) illustrate side views of an absorption of a battery system, in accordance with embodiments.

DESCRIPTION

An absorption device 10 of a battery system in accordance with embodiments is illustrated in FIGS. 1 to 2, having a resilient and fluid-permeable first material ply 2.1 and a resilient and fluid-permeable second material ply 2.2 approximately parallel to the first material ply 2.1. The first and the second material ply 2.1, 2.2 may be interconnected over certain portions thereof, such interconnections forming pockets 9.

Absorbing elements, for example in the form of fleece or bulk material, may be accommodated in a corresponding one of the pockets 9. The pockets 9 are formed on the underside of the first material ply 2.1 by adhesive elements 3 (having a rectangular cross-section) in the plane of the material plies 2.1, 2.2, since the adhesive 3.1 of the adhesive elements 3 passes through the first material ply 2.1 and produces a connection to the second material ply 2.2. The connection of the first material ply 2.1 to the second material ply 2.2 may also be produced by a separate second two-sided adhesive element 11. The adhesive elements 3 also have, on an underside thereof, adhesive for fastening to a battery housing 5 (see FIG. 4), or may be fastened by other suitable device to a battery housing 5. As illustrated in FIG. 2, the grid-shaped support element may be both an adhesive element 3 and a frame 4.

Figure 6:
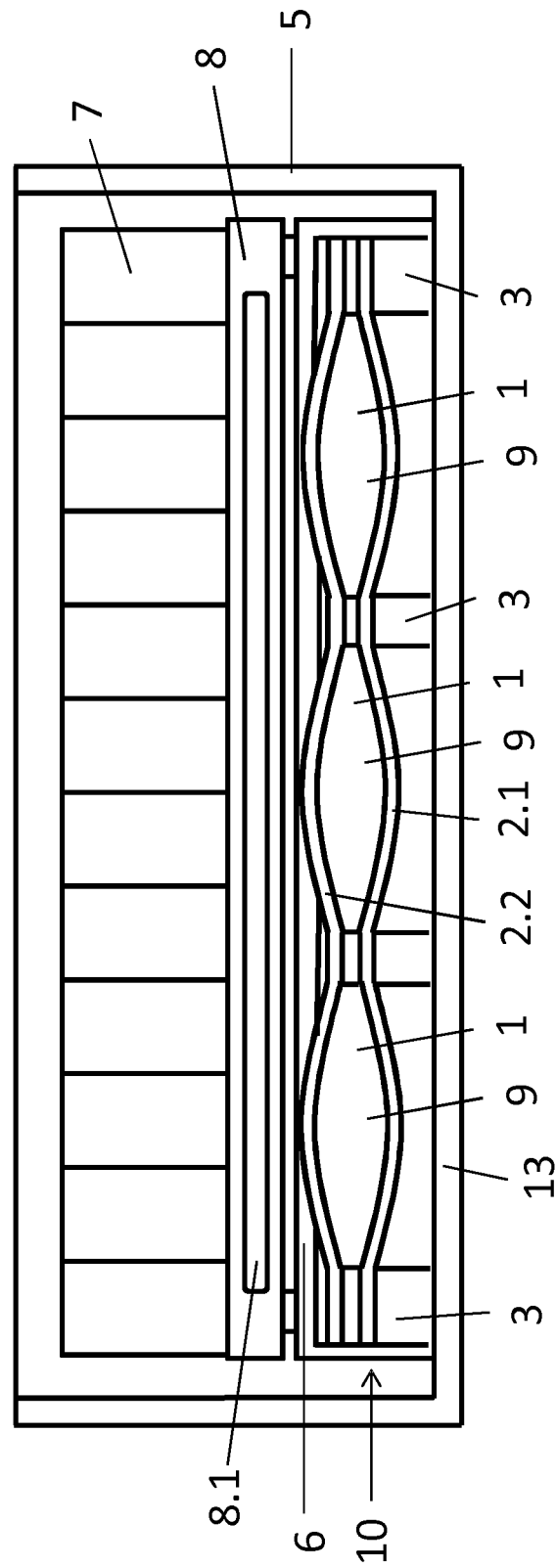
FIG. 6 illustrates a side view along the line of section A-A of FIG. 5.

As illustrated in FIGS. 3 and 4, an absorption device 10 may be arranged in a battery housing 5 in such a way that it covers a large region spatially above the base 13 of the battery housing 5. The adhesive elements 3 of the absorption device 10 may be adhesively bonded to the battery housing 5 for this purpose. To fasten cells 7 and/or a heat sink 8 (see FIG. 6), fastening portions 6 likewise mounted on and/or over the base 13 of the battery housing 5, for example, fastening strips mounted in a manner raised from the base, are provided. The fastening strips may have flange faces 6.1. Cells 7 and heat sink 8 are assembled in an installation direction spatially above the absorbing elements 1 of the absorption device 10, for example, so as to facilitate a flow of escaped fluid of the heat sink 8 onto the absorbing elements 1.

Figure 7:
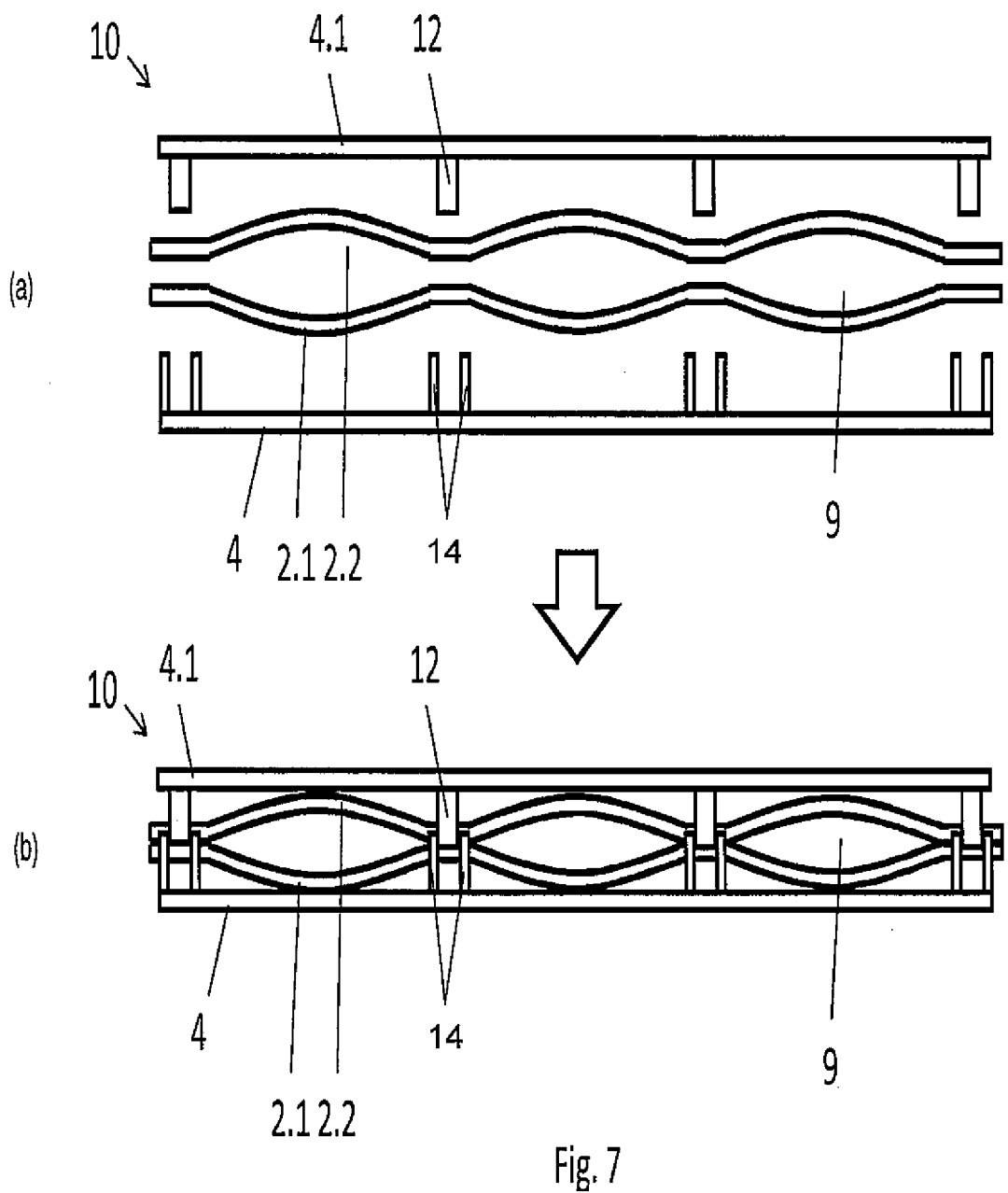

As illustrated in FIG. 7(*a*), in accordance with embodiments, the support element is a frame 4 attached between the outer face of the first material ply 2.1 and the battery housing 5. A counter frame 4.1 may be attached to the outer face of the second material ply 2.2 for the formation of pockets. The frame 4 has first extensions 14 forming a male connector, and the counter frame 4.1 has second extensions 12 forming a female connector. The first extension 14 may be received into the second extensions 12 to establish an interconnection between the frame 4 and the counter frame 4.1. In the upper part of FIG. 7, the frame 4 and counter frame 4.1 are not yet plugged into one another, and therefore the material plies 2.1 and 2.2 are not yet interconnected over portions and pockets 9 are not yet formed.

As illustrated in FIG. 7(*b*), the pockets 9 are formed by plugging the frame 4 and counter frame 4.1 into one another. The frame 4 is fastened by suitable device to the base of a battery housing 5. The frame 4 may also be formed by the battery housing 5. The counter frame 4.1 may also be formed by the heat sink 8.

Embodiments thus specifies a battery system that may be produced easily and cost effectively and that has a reliable absorption device.

The term "coupled," "fastened" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 absorbing elements
2.1 first material ply
2.2 second material ply
3 adhesive element
3.1 adhesive
4 frame
4.1 counter frame
5 battery housing
6 fastening portion
6.1 flange faces
7 cells
8 heat sink
8.1 coolant duct
9 pocket
10 absorption device
11 second two-sided adhesive element

What is claimed is:

1. A battery system comprising:
   a housing;
   a plurality of cells in the housing;
   a support element comprising:
      a first support frame section comprising first support frame extensions which act as male connectors; and
      a second support frame section comprising second support frame extensions which act as female connectors, ones of the female connectors respectively receiving a corresponding one of the male connectors to removably connect the first support frame section to the second support frame section; and
   an absorption device in the housing and connected to the housing by the support element, the absorption device being configured to absorb fluid in the housing, the absorption device comprising:
      a first material ply;
      a second material ply connected over certain regions thereof to the first material ply in such a manner which forms a plurality of pockets; and
      an absorbing element in the pockets.

2. The battery system of claim 1, wherein the connection between the first support frame section and the second support frame section establishes the connection between the first material ply and the second material ply.

3. The battery system of claim 1, wherein:
   the first support frame section is between an outer face of the first material ply and a bottom surface of the housing; and
   the second support frame section is arranged over an outer face of the second material ply.

4. The battery system of claim 1, wherein the second support frame section comprises a heat sink.

5. The battery system of claim 1, wherein:
   the first material ply is fluid permeable; and
   the second material ply is fluid permeable.

6. The battery system of claim 1, wherein the first material ply is fluid permeable.

7. The battery system of claim 1, wherein the second material ply is fluid permeable.

8. The battery system of claim 1, wherein the first material ply has a thickness less than 0.1 mm.

9. The battery system of claim 1, wherein the first material ply has a plurality of apertures.

10. The battery system of claim 1, wherein the support element is fastened to a base of the housing.

11. The battery system of claim 1, further comprising a two-sided adhesive film attached between an outer face of the first material ply and the housing.

12. The battery system of claim 11, further comprising a second two-sided adhesive film attached between the first material ply and the second material ply.

13. The battery system of claim 1, further comprising fastening portions to fasten the cells to a base of the housing such that lower edges of the cells are arranged above absorbing elements with respect to the base of the housing.

14. The battery system of claim 1, further comprising a heat sink in the housing.

15. The battery system of claim 14, wherein the heat sink is arranged above the absorbing elements with respect to a base of the housing.

16. A battery system comprising:
   a housing comprising a first support frame section comprising first support frame extensions acting as male connectors and a second support frame section comprising second support frame extensions acting as female connectors, ones of the female connectors receiving a corresponding one of the male connectors to removably connect the first support frame section to the second support frame section;

a plurality of cells in the housing; and an absorption device in the housing to absorb fluid in the housing, the absorption device comprising:

a first material ply;

a second material ply connected to the first material ply in such a manner which forms a plurality of pockets; and an absorbing element in the pockets.

17. The battery system of claim 16, wherein the connection between the first support frame section and the second support frame section establishes the connection between the first material ply and the second material ply.

18. The battery system of claim 16, wherein:

the first support frame section is between an outer face of the first material ply and the housing; and the second support frame section is arranged above an outer face of the second material ply.

19. The battery system of claim 16, wherein the second support frame section comprises a heat sink.

\* \* \* \* \*